US008635687B2

(12) United States Patent
Binder (10) Patent No.: US 8,635,687 B2
(45) Date of Patent: Jan. 21, 2014

(54) METHOD AND DEVICE FOR CONTROL BY CONSUMERS OVER PERSONAL DATA

(75) Inventor: Philip A. Binder, Ramsey, NJ (US)

(73) Assignee: MasterCard International Incorporated, Purchase, NY (US)

( * ) Notice: Subject to any disclaimer, the term of this patent is extended or adjusted under 35 U.S.C. 154(b) by 1790 days.

(21) Appl. No.: 10/236,302

(22) Filed: Sep. 6, 2002

(65) Prior Publication Data

US 2003/0140228 A1    Jul. 24, 2003

Related U.S. Application Data

(60) Provisional application No. 60/317,574, filed on Sep. 6, 2001.

(51) Int. Cl.
*G06F 17/00* (2006.01)

(52) U.S. Cl.
USPC ........ 726/18; 726/5; 705/53; 705/77; 705/78; 705/79; 235/375; 235/379; 235/380; 235/381; 235/382

(58) Field of Classification Search
USPC ............. 455/409; 235/379–382, 375; 705/50, 705/51, 53, 77–79, 36 R; 704/273; 726/5, 726/18
See application file for complete search history.

(56) References Cited

U.S. PATENT DOCUMENTS

| 4,860,336 | A | * | 8/1989 | D'Avello et al. ............ 455/558 |
| 4,860,341 | A | * | 8/1989 | D'Avello et al. ............ 455/409 |
| 5,594,227 | A | | 1/1997 | Deo ............................ 235/380 |
| 5,809,241 | A | | 9/1998 | Hänel et al. ............. 395/200.36 |
| 5,983,249 | A | | 11/1999 | Kimura ........................ 708/140 |
| 6,057,779 | A | * | 5/2000 | Bates ......................... 340/5.21 |
| 6,092,197 | A | | 7/2000 | Coueignoux ................ 713/200 |
| 6,179,205 | B1 | * | 1/2001 | Sloan .......................... 235/382 |
| 6,332,134 | B1 | * | 12/2001 | Foster ....................... 705/36 R |
| 6,360,321 | B1 | | 3/2002 | Gressel et al. ............... 713/172 |
| 6,615,194 | B1 | * | 9/2003 | Deutsch et al. ................ 705/75 |
| 6,731,536 | B1 | * | 5/2004 | McClain et al. ......... 365/185.04 |
| 6,957,776 | B1 | * | 10/2005 | Ng ............................. 235/474 |
| 2002/0087472 | A1 | * | 7/2002 | Walter ......................... 705/41 |
| 2002/0091562 | A1 | * | 7/2002 | Siegel et al. .................. 705/10 |
| 2002/0194069 | A1 | * | 12/2002 | Thakur et al. ................. 705/14 |
| 2003/0023678 | A1 | * | 1/2003 | Rugelj ........................ 709/203 |
| 2006/0169768 | A1 | * | 8/2006 | Gangi ......................... 235/380 |

FOREIGN PATENT DOCUMENTS

| JP | 2000-194666 | 7/2000 |
| JP | 2001-222606 | 8/2001 |
| WO | WO 97/29567 | 8/1997 |
| WO | WO 01/27724 | 4/2001 |
| WO | WO 01/33936 | 5/2001 |

* cited by examiner

*Primary Examiner* — Thanhnga B Truong
(74) *Attorney, Agent, or Firm* — Baker Botts L.L.P.

(57) ABSTRACT

There is provided a method and device for providing personal data of first party to a second party. The personal data is stored in an electronic device comprising a mechanism for locking and unlocking access to the personal data and/or condition data stored therein associated with conditions for accessing said personal data. The second party receives the personal data dependent on whether the personal data is in a locked state and/or whether the conditions associated with the condition data are satisfied.

22 Claims, 9 Drawing Sheets

METHOD AND DEVICE FOR CONTROL BY CONSUMERS OVER PERSONAL DATA

PRIORITY APPLICATION

This application claims priority to U.S. provisional application 60/317,574 filed on Sep. 6, 2001, and entitled "Method and Device for Control By Consumers Over Personal Data," which is hereby incorporated by reference.

BACKGROUND OF INVENTION

The present invention relates to a method and device for control by consumers over personal data.

Today, the collection and dissemination of personal consumer data for marketing purposes is ubiquitous. Direct marketers, in particular, use personal data to target their activities to consumers most likely to be interested in the marketer's products and/or services. This personal data, however, is largely collected without the consumers' knowledge or permission and without any remuneration to the consumers. For example, merchants with which consumers transact business may collect consumers' personal data during transactions with the consumers and, unless the consumers are savvy enough to expressly request otherwise, the merchants may then sell the personal data to direct marketers or others without the consumers' knowledge.

The existing methods of collection and dissemination of personal data has produced strong complaints by consumers' rights advocacy groups. In response, governments and regulatory bodies throughout the world are strengthening the laws and regulations surrounding the gathering and dissemination of personal data.

Under certain circumstances, however, consumers may be willing to provide their personal data to merchants or marketers. Accordingly, it would be desirable to have a method and device for easily allowing consumers to make situation-specific decisions regarding the dissemination of their personal data.

SUMMARY OF THE INVENTION

In accordance with the present invention, there is provided a method for providing the personal data related to a first party to a second party. The personal data is stored in an electronic device, which includes a mechanism for locking and unlocking access to the personal data. The method includes the step of receiving the personal data by the second party dependent on whether the personal data is in a locked or unlocked state.

Preferably, the method further includes the step of providing an economic benefit by the second party to the first party in exchange for the personal data. The economic benefit may be, for example, a discount on a purchase made by the first party, a monetary remuneration, or points for a loyalty program for which the first party is a participant.

By way of example, the personal data may include the name, address, telephone number, and email address of the first party. The personal data may also include demographic information related to the first party.

In a preferred embodiment, the electronic device is an integrated circuit ("IC") card, which includes a processing unit and a memory coupled to the processing unit. In this embodiment, the personal data and a data access code are stored in the memory of the IC card. In addition, the mechanism for locking and unlocking access to the personal data comprises an application stored in the memory of the IC card. Then, the method may further include the steps of executing the application on the processing unit; providing a data access code by the first party to the application; and unlocking access by the application to the personal data responsive to whether the provided data access code matches the stored data access code.

Preferably, the memory of the IC card further includes a data access flag stored therein indicative of whether the personal data is in a locked or unlocked state. The step of unlocking access to the personal data may then include the step of storing in the data access flag a value indicative of an unlocked state for the personal data responsive to whether the provided data access code matches the stored data access code. Preferably, the application locks access to the personal data after each transmission of the personal data.

In yet another embodiment of the present invention, the electronic device includes a transmitter for transmitting the personal data using radio-frequency electromagnetic waves. In this embodiment, the mechanism for locking and unlocking access to the personal data is a mechanical switch coupled to the transmitter. The electronic device may also be a computer coupled to a computer network, such as the Internet.

In yet another embodiment of the present invention, there is provided another method for providing personal data related to a first party to a second party. The method includes an electronic device having stored therein the personal data of the first party and condition data associated with conditions of access to the personal data. The method includes the steps of transmitting data by the second party associated with the conditions of access to the personal data; and receiving at least certain of the personal data by the second party dependent on whether the transmitted data is consistent at least in part with the condition data.

Preferably, as in the previous embodiment, the method further includes the step of providing an economic benefit by the second party to the first party in exchange for the personal data. As in the previous embodiment, the electronic device is preferably an IC card, in which case the personal data and the condition data are stored in the memory of the IC card and an application determines whether the data transmitted by the second party is consistent at least in part with the condition data. Instead of an IC card, the electronic device may also be a computer coupled to a computer network, such as the Internet.

In yet another embodiment of the present invention, there is provided an electronic device for providing personal data. The electronic device includes means for storing the personal data; means for controlling access to the personal data; and means for transmitting the personal data responsive to the means for controlling access to the personal data. Preferably, the electronic device further includes means for receiving a economic value in exchange for transmitting the personal data. Such economic value may include electronic money and points for a loyalty program.

Preferably, the electronic device is an IC card, which includes a processing unit and a memory coupled to the processing unit. In this case, the personal data is stored in the memory of the IC card. Preferably, the means for controlling access to the personal data includes a data access flag stored in the memory indicative of whether the personal data is in a locked or unlocked state and the means for transmitting the personal data responsive to the means for controlling access to the personal data includes an application stored in the memory. The application transmits the personal data if the data access flag indicates an unlocked state.

The memory of the IC card may further include a first data access code stored therein. The application may then receive a second data access code by a user of the IC card and may store a value indicative of an unlocked state in the data access flag responsive to whether the second data access code matches the first data access code.

Instead of a data access flag, the means for controlling access of the electronic device may be condition data stored in the memory of the IC card, the condition data being associated with conditions of access to the personal data. In this case, the application stored in the IC card may include means for receiving data associated with the conditions of access to the personal data and means for transmitting at least certain of the personal data if the received data is consistent at least in part with the condition data.

Instead of an IC card, the electronic device may be a computer coupled to a computer network or a portable device including a radio transmitter and a switch coupled to the radio transmitter for controlling the transmission of the personal data.

BRIEF DESCRIPTION OF THE DRAWINGS

The invention will be better understood from the following detailed description of exemplary embodiments thereof in conjunction with the accompanying drawings in which.

Throughout the figures of the drawings the same reference numerals or characters are used to denote like components or features of the invention.

DETAILED DESCRIPTION OF THE INVENTION

Figure 1:
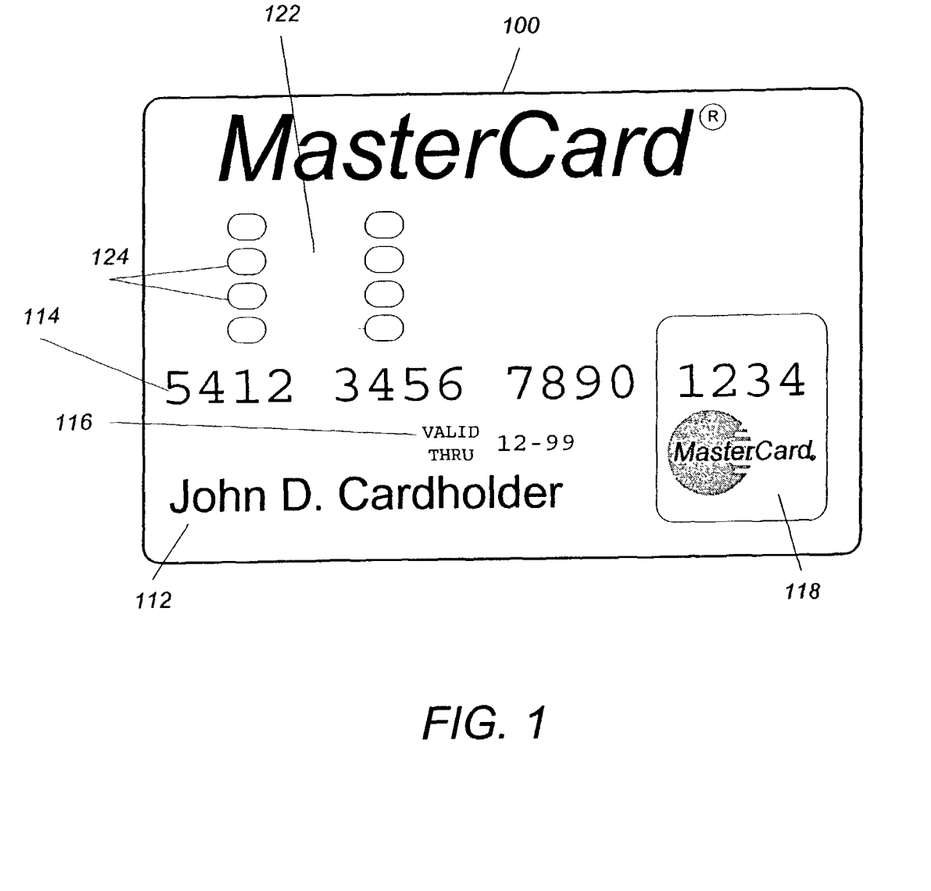
FIG. 1 is a front view of an integrated circuit card according to a preferred embodiment of the present invention.

A preferred embodiment of the present invention will be described with reference to an integrated circuit ("IC") card, which is illustrated in FIG. 1. The IC card 100 looks similar to a conventional credit card, but also includes an integrated circuit 122 therein and electrical contacts 124 for communication between the integrated circuit 122 and devices external to the IC card 100. The IC card 100 may be used as a credit card, a debit card, and an electronic cash card (i.e., a card containing monetary value that can be transferred when the cardholder makes purchases). Similar to the conventional credit card, the front side of the IC card 100 preferably contains the cardholder's name 112, the cardholder's account number 114, the date until which the card is valid 116, and the logo 118 of the financial company whose services are used by the card (e.g., MasterCard®).

As used in this specification and the appended claims, the term "terminal" shall be used to generically describe devices with which an IC card may communicate. A terminal typically includes a card reader, a keypad, and a display. The keypad and the display allow a user of the IC card 100 to interact with the terminal. The keypad allows the user to select a transaction, to enter a personal identification number ("PIN"), and to enter transactional information. The display allows the user to receive informational messages and prompts for data entry. By way of example, a terminal may comprise a card reader in communication with or incorporated into a point-of-sale device, an ATM, a computer, and/or a telephone.

Figure 2:
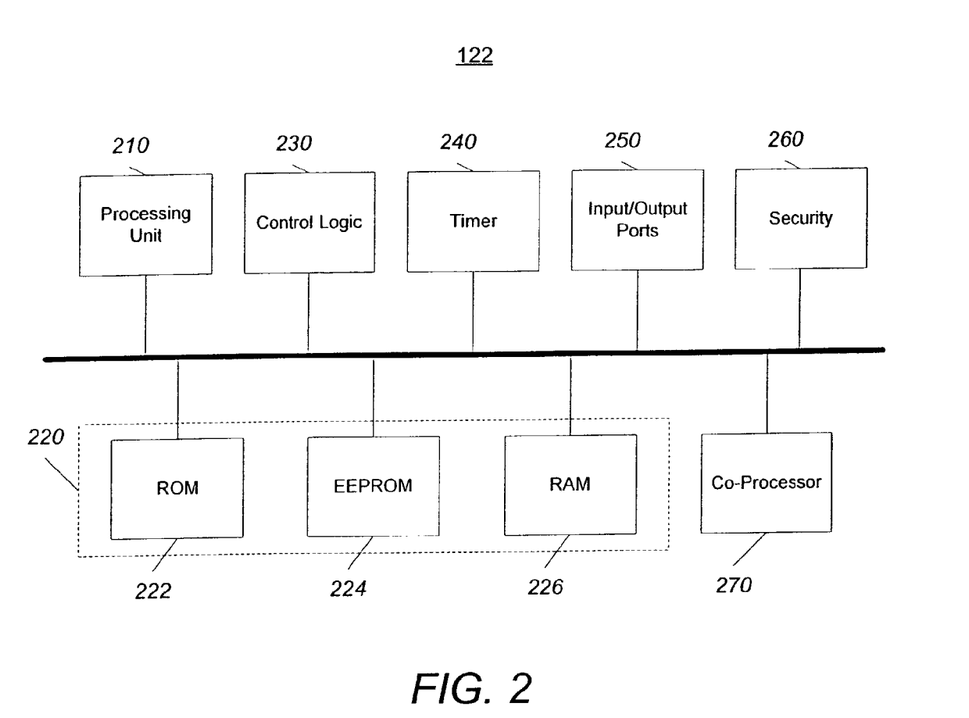
FIG. 2 is a functional block diagram of the integrated circuit of an integrated circuit card according to a preferred embodiment of the present invention.

FIG. 2 is a functional block diagram of a preferred embodiment of the integrated circuit 122. The integrated circuit 122 includes a processing unit 210, a memory unit 220, control logic 230, a timer 240, input/output ports 250, security circuitry 260, and a co-processor 270. The control logic 230 provides, in conjunction with the processing unit 210, the control necessary to handle communications between the memory unit 220 and the input/output ports 250. The timer 240 provides a timing reference signal for the processing unit 210 and the control logic 230. The security circuitry 260 preferably provides fusible links that connect the input/output ports 250 to internal circuitry for testing during manufacturing. The fusible links are burned after completion of testing to limit later access to sensitive circuit areas. The co-processor 270 provides the ability to perform complex computations in real time, such as those required by cryptographic algorithms.

The memory unit 220 may include different types of memory, such as volatile and non-volatile memory and read-only and programmable memory. For example, as shown in FIG. 2, the memory unit 220 may include read-only memory (ROM) 222, electrically erasable programmable read-only memory (EEPROM) 224, and random-access memory (RAM) 226.

Figure 3:
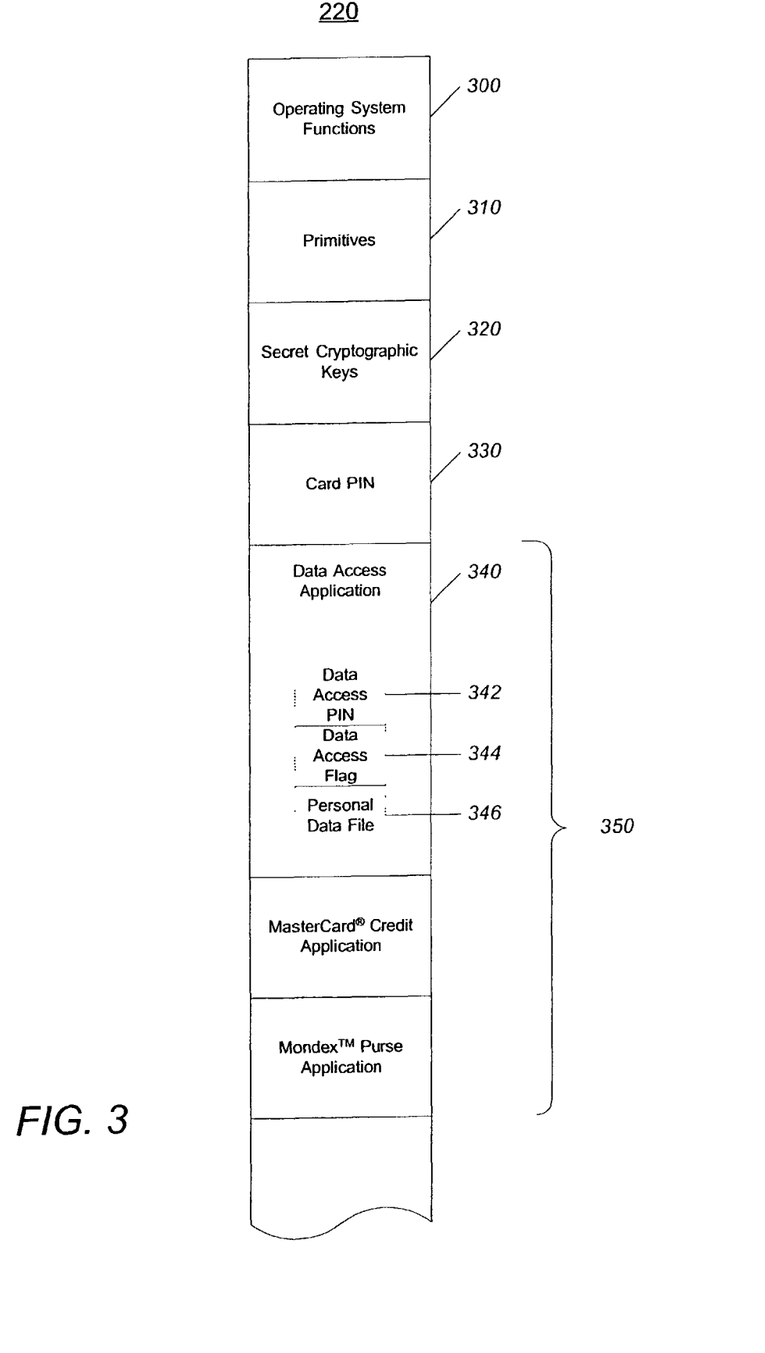
FIG. 3 is a memory map of a preferred embodiment of the integrated circuit of FIG. 2.

FIG. 3 shows a memory map of the memory unit 220 according to a preferred embodiment of the present invention. As shown in FIG. 3, the memory unit 220 stores therein unique IC card data such as secret cryptographic keys 320 and a card PIN 330. The secret cryptographic keys 320 may be any type of well-known cryptographic keys, such as the private keys of public-key pairs, which are used for authentication of the IC card and data stored in the IC card. The card PIN 330 may be used to lock and unlock access to the IC card. Preferably, the secret cryptographic keys 320 and the card PIN 330 are stored in a secure area of ROM or EEPROM that is either not accessible or has very limited accessibility from outside the IC card.

The memory unit 220 also stores the operating system 300 of the IC card 100. The operating system 300 loads and executes IC card applications and provides file management and other basic card services to the IC card applications. Preferably, the operating system is stored in ROM.

In addition to the basic services provided by the operating system, the memory unit 220 may also include one or more IC card applications 350. For example, if the IC card is to be used as an electronic cash card, the application Mondex™ Purse from Mondex International Limited might be included on the IC card, which loads an electronic value of a certain currency onto the IC card. In addition, if the IC card is to be used as a credit card, the MasterCard® Credit application from MasterCard® International, Inc., may be included on the IC card. Preferably, the operating system 300 of the IC card 100 should support multiple applications 350. An example of such an operating system is the MULTOS™ operating system from Mondex International Limited.

An IC card application may include both program and associated data files, which are typically stored in EEPROM. The application program may be written either in the native programming code of the processing unit 210 or it may be written in a higher level language that must be translated before it is executed on the processing unit 210. An example of such a higher level language for use on IC cards is the MULTOS™ Executable Language (MEL). Advantageously, by using a higher level language such as MEL, an application program is capable of running on multiple hardware platforms without any need for re-writing.

Because IC cards typically have limited memory capacity due to the size and cost restraints of placing memory on the IC cards, an IC card may also have primitives 310 stored in ROM, which are subroutines that perform frequently used functions or procedures, such as mathematical functions. The primitives 310 are usually written in the native language of the processing unit 210 so that they can be executed very quickly.

In accordance with a preferred embodiment of the present invention, the memory unit 220 also includes a data access application 340. The data access application 340 has associated therewith a data access PIN 342, a data access flag 344, and a personal data file 346. The data access PIN 342 permits access to certain functions of the data access application 340 (to be discussed below). The data access flag 344 indicates the state of the personal data file 346—i.e., whether the personal data file is locked or unlocked. The personal data file 346 contains personal information of the cardholder. Such information may include, for example, the name, address, telephone number, email address, and/or demographic information of the cardholder.

Figure 4:
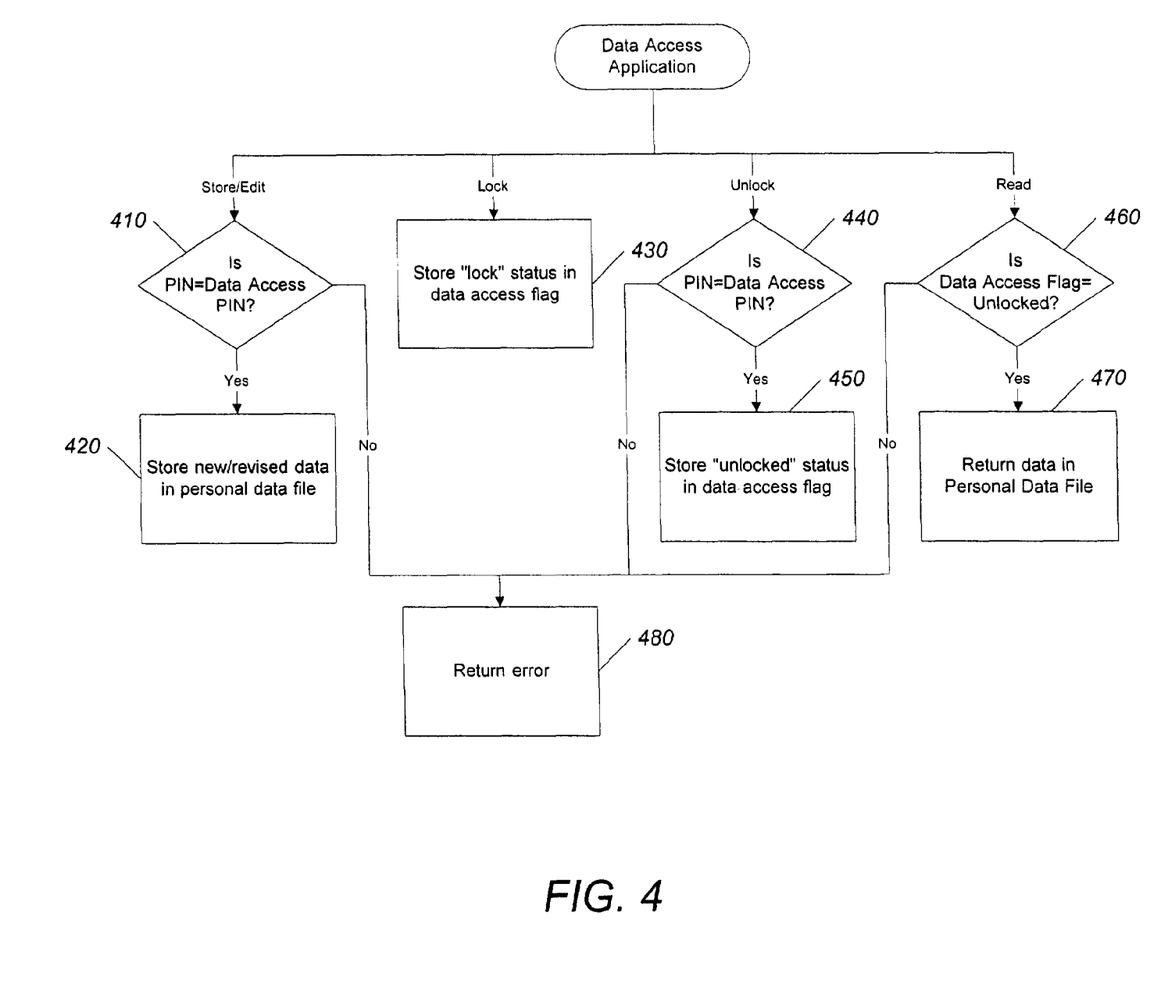
FIG. 4 is a flow chart of a preferred embodiment of a data access application.

FIG. 4 is a flow chart of a preferred embodiment of the data access application 340. The data access application 340 has four functions: a store/edit function, a lock function, an unlock function, and a read function. The store/edit function is used to store and/or edit information in the personal data file 346. When this function is selected, it is necessary to transmit a PIN to the data access application 340. In step 410, the data access application determines whether the transmitted PIN matches the data access PIN 342. If the transmitted PIN matches the data access PIN 342, in step 420, the data access application stores new or revised data in the personal data file 346. Otherwise, if the transmitted PIN does not match the data access PIN 342, in step 480, the data access application returns an error code.

When the lock function is selected, in step 430, the data access application stores a value in the data access flag 344 indicative of a locked state for the personal data file 346. When the unlock function is selected, a PIN is again required to be provided to the data access application 340. In step 440, the data access application determines whether the transmitted PIN matches the data access PIN 342. If the transmitted PIN matches the data access PIN 342, in step 450, the data access application stores a value in the data access flag 344 indicative of an unlocked state for the personal data file 346. Otherwise, if the transmitted PIN does not match the data access PIN 342, in step 480, the data access application returns an error code.

When the read function is selected, in step 460, the data access application 340 determines whether the data access flag 344 indicates that the personal data file 346 is unlocked. If the data access flag 344 indicates an unlocked state, the data in the personal data file 346 is returned in step 470. Otherwise, if the data access flag 344 indicates a locked state, a error code is returned in step 480.

Figure 5:
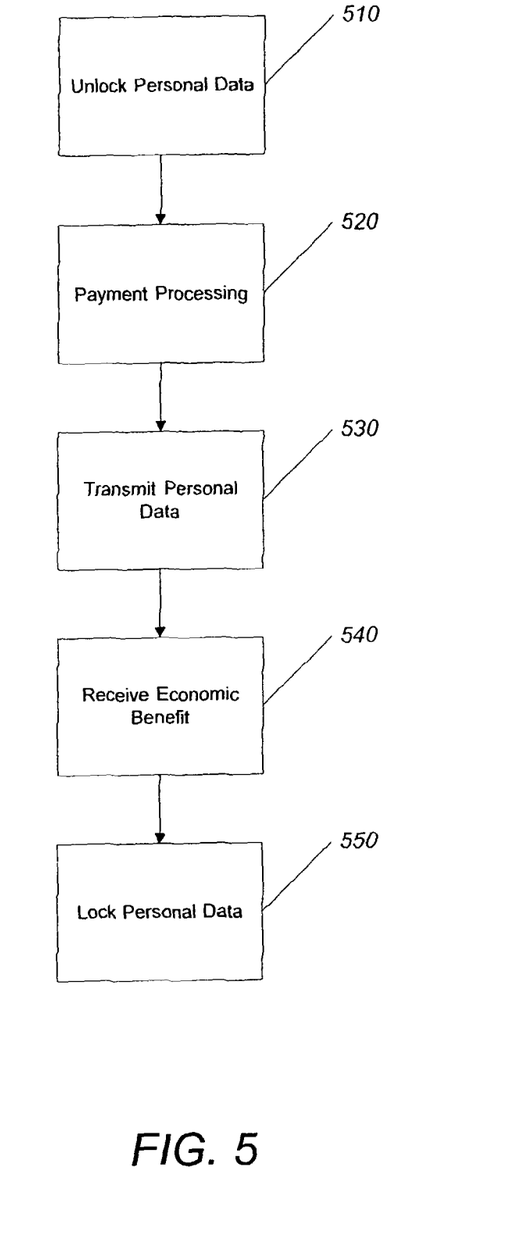
FIG. 5 is a flow chart of an exemplary transaction involving an integrated circuit card according to a preferred embodiment of the present invention.

FIG. 5 is a flow chart of an exemplary transaction involving the data access application 340 of the IC card 100. It is assumed that prior to the beginning of the transaction, the data access flag 344 indicates a locked state for the personal data file 340. In addition, it is assumed, for the purposes of this example, that the cardholder is ready to buy a product using the MasterCard® Credit application stored on the IC card 100. In step 510, the cardholder determines to permit the merchant with which he or she is about to transact business to have access to the data in the personal data file 346. Accordingly, using a terminal provided by the merchant, the cardholder executes the data access application 340, selects the unlock function, and enters a PIN matching the data access PIN 342. The data access application 340 then sets the data access flag 344 to a value indicative of an unlocked state for the personal data file 346.

In step 520, the cardholder uses the IC card 100 to tender payment for the product for which he or she is interested in buying. Once the payment is processed by the merchant, in step 530, the merchant attempts to read the personal data file 346 by executing the data access application 340. Since the data access flag 344 indicates an unlocked state, the data access application 340 transmits the data in the personal data file 346 to the merchant.

Preferably, in step 540, the merchant provides an economic benefit to the cardholder in exchange for access to the personal data file. For example, the merchant may provide direct remuneration in the form of a purchase discount or a rebate. Alternatively, the merchant may provide indirect remuneration in the form of loyalty points that are redeemable under the terms and conditions of a loyalty program for which the cardholder is a participant. In step 550, at the end of the transaction, the cardholder locks the personal data file using the data access application. Alternatively, the data access application may automatically lock the personal data file after each transmission of the data in the personal data file. Thus, in subsequent transactions, other merchants are prevented from accessing the personal data file unless it is explicitly unlocked by the cardholder.

Figure 6:
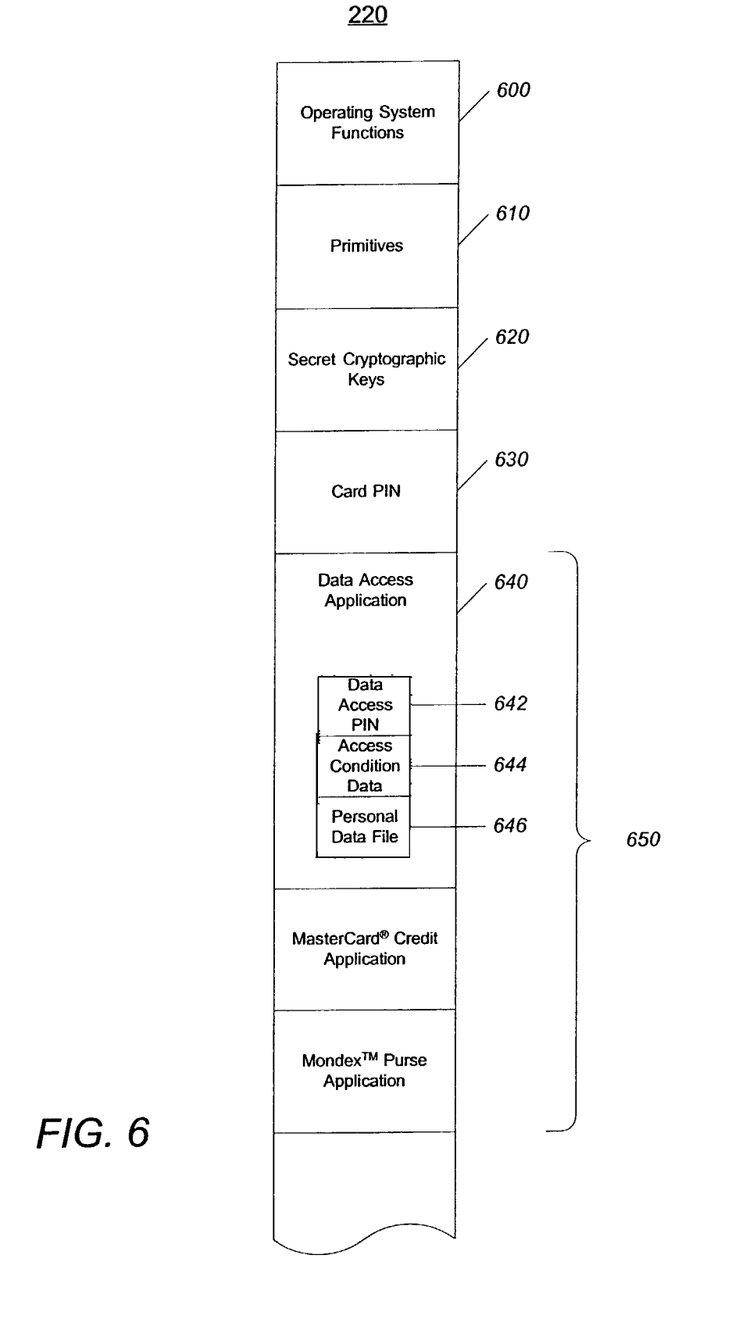
FIG. 6 is a memory map of another preferred embodiment of the integrated circuit of FIG. 2.

FIG. 6 shows a memory map of another preferred embodiment of the memory unit 220. The embodiment of FIG. 6 includes an operating system 600, primitives 610, secret cryptographic keys 620, a card PIN 630, and applications 650, which are the same as those discussed with reference to the embodiment of FIG. 3.

The embodiment of FIG. 6 also includes a data access application 640, which has associated therewith a data access pin 642, access condition data 644, and a personal data file 646. The data access pin 342 permits access to certain functions of the data access application 640 (to be discussed below). The access condition data 644 indicates the terms and conditions under which the data in the personal data file 646 is to be accessed. For example, the access condition data may indicate the identity of the merchants to whom the data in the personal data files may be provided. In addition, the access condition data may indicate the minimum remuneration the cardholder requires for access to the data in the personal data file. Such merchant or remuneration requirements may be specified for the data in the personal data file as a whole or may be specified individually for each data item in the personal data file. As previously discussed, the personal data file contains personal information of the cardholder, such as the name, address, telephone number, email address, and/or demographic information of the cardholder.

Figure 7:
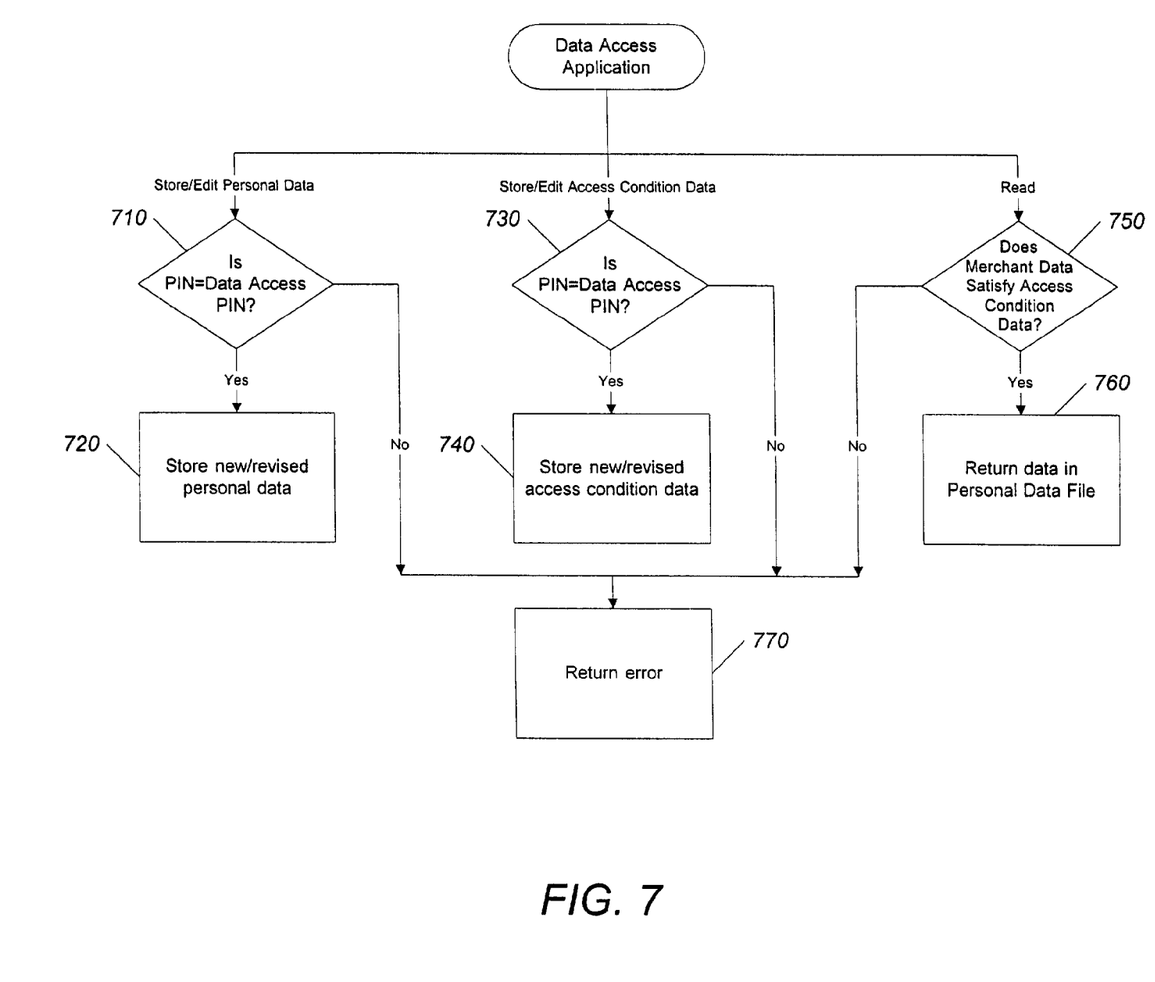
FIG. 7 is a flow chart of another preferred embodiment of a data access application.

FIG. 7 is a flow chart of a preferred embodiment of the data access application 640 of FIG. 6. The data access application 640 contains three functions: a store/edit personal data function, a store/edit access condition data function, and a read function. When the store/edit personal data function is selected, the data access application 640 determines in step 710 whether a transmitted PIN matches the data access PIN 642. If the transmitted PIN matches the data access PIN 642, the data access application stores new or revised data in the personal data file 646 in step 720. Otherwise, if the transmitted PIN does not match the data access PIN 642, the data access application returns an error code in step 770.

When the store/edit access condition data function is selected, the data access application 640 determines in step 730 whether a transmitted PIN matches the data access PIN 642. If the transmitted PIN matches the data access PIN 642, the data access application 640 stores new or revised access condition data in step 740. Otherwise, if the transmitted PIN does not match the data access PIN 642, the data access application returns an error code in step 770.

When the read function is selected, the data access application 640 compares data provided by a merchant associated with the conditions of access with the conditions specified by the access condition data 644. If some or all of the conditions are satisfied, some or all of the data in the personal data file is provided to the merchant in step 760. Otherwise, the data access application 640 returns an error code in step 770. To ensure the accuracy of the data to be provided by the merchant, such data may be encoded into the merchant terminals or digitally signed by IC card issuers.

Figure 8:
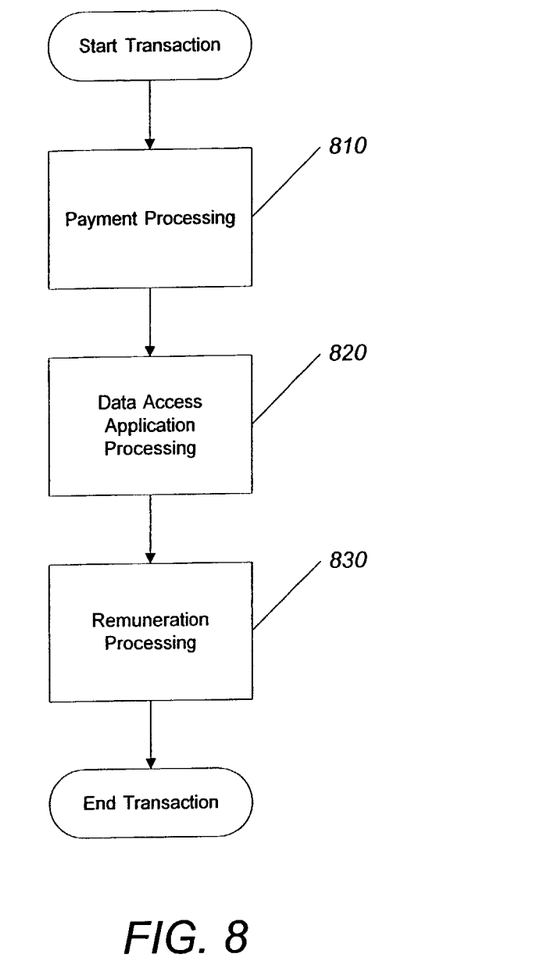
FIG. 8 is a flow chart of an exemplary transaction involving an integrated circuit card according to another preferred embodiment of the present invention.

FIG. 8 is a flow chart showing a typical transaction involving an IC card with the data access application 640 stored therein. In step 810, the payment processing of the cardholder's purchase is performed. Such processing may involve, for example, the execution of the MasterCard® Credit application on the IC card. In step 820, after the payment processing, the data access application 640 is selected and the merchant attempts to read the personal data file as described with reference to the read function of the data access application 640. If the merchant successfully reads the personal data file, the merchant provides the cardholder with a form of remuneration in step 830.

The embodiments of the data access applications of FIGS. 3-4 and FIGS. 6-7 are not exclusive, but may be combined. A data access application combining the features of the prior embodiments would operate in the same manner as previously discussed, except for the read function.

Figure 9:
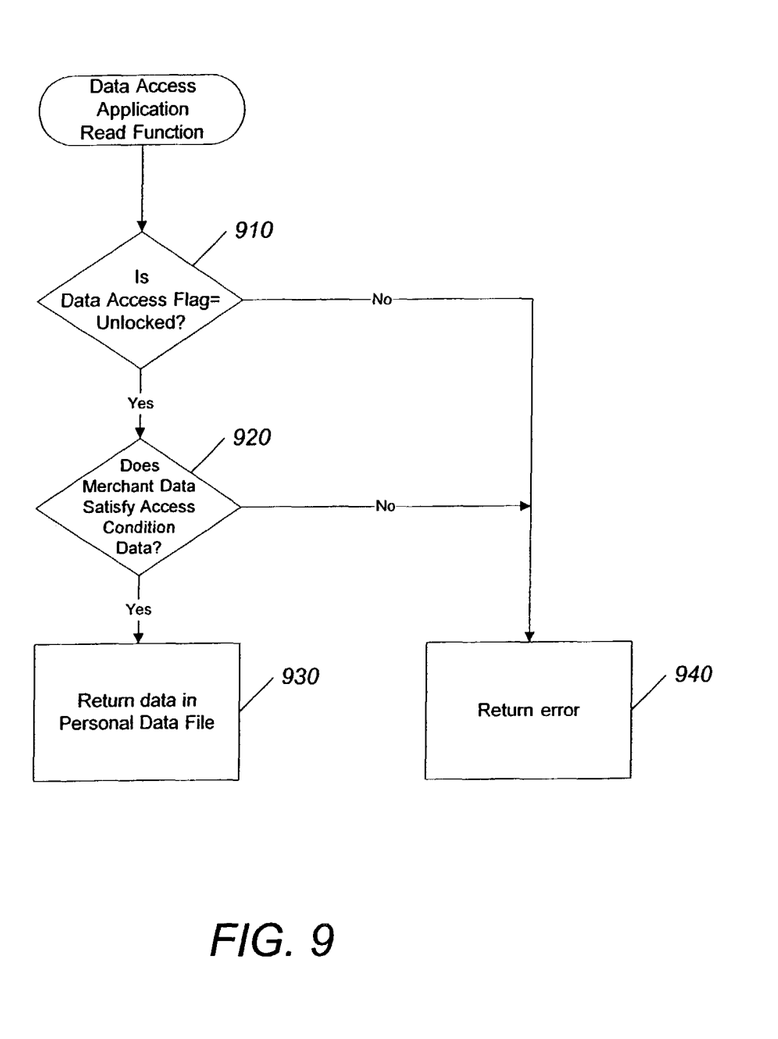
FIG. 9 is a flow chart of a read function of a data access application according to another preferred embodiment of the present invention.

FIG. 9 is a flow chart of a preferred embodiment of the read function for a data access application combining the features of the previous embodiments. In step 910, the data access application first determines if the data access flag indicates an unlocked state for the personal data file. If the data access flag indicates an unlocked state, in step 920, the data access application determines whether the merchant data satisfies the conditions indicated by the access condition data. If both the data access flag indicates an unlocked state and the access conditions are satisfied, the data access application transmits the personal data file to the merchant in step 930. Otherwise, an error code is returned to the merchant in step 940.

Although the preferred embodiments of the present invention utilize an IC card, the present invention is not limited to such embodiments. Other portable data devices which are utilized in commercial transactions may be used with the present invention. For example, certain transportation authorities have implemented electronic toll collection systems that make paying tolls on bridges and tunnels faster and more convenient for motorists. One such system is the E-Z Pass system implemented by the Metropolitan Transportation Authority of New York State. The E-Z Pass system uses a portable electronic device that contains a radio transmitter that transmits a code exclusively identifying a motorist's account. When a motorist approaches a toll gate, a receiver installed in the toll gate receives the motorist's unique code and the system automatically deducts a toll amount from a prepaid account held by the motorist.

According to the present invention, the personal data of a motorist could be stored in such an electronic toll device and could be transmitted to the toll authority for its use. The electronic toll device could be equipped with a mechanism for locking and unlocking the personal data, such as a switch that controls the transmission of the personal data. In return for the transmission of the personal data, the toll authority could provide a toll discount or other benefit.

As yet another example, the present invention could be utilized with electronic commerce over a computer network, such as the Internet. In this case, the personal data of a computer user, a data access PIN, and a data access application could be stored on the computer user's computer, instead of on an IC card. In addition, a data access flag and/or condition data may also be stored on the user's computer. Then, when the user engages in an electronic transaction with a merchant, the user's personal data may be transmitted to the merchant's computer if the personal data file is unlocked by the user and/or the merchant satisfies the conditions indicated by the condition data of the user.

Although the present invention has been described with reference to certain preferred embodiments, various modifications, alterations, and substitutions will be known or obvious to those skilled in the art without departing from the spirit and scope of the invention, as defined by the appended claims.

The invention claimed is:

1. A method for providing first party data to a second party, the first party data related to a first party and being stored in a payment device comprising a mechanism for locking and unlocking access to said first party data, the method comprising: storing said first party data in a memory unit of said payment device, said first party data having a locked state and an unlocked state; performing payment processing of a purchase between the first party and the second party; receiving a request to read said first party data from said second party; after the payment processing, determining whether said first party data is in said locked state or said unlocked state in response to said request; and providing said first party data to said second party in response to said request only when said first party data is in said unlocked state, wherein said first party data is at least one of an address, a telephone number, an email address, and demographic information of said first party, wherein the payment device comprises a data access application, the data access application comprising the mechanism for locking and unlocking access to said first party data, a mechanism for determining whether said first party data is in said locked state or said unlocked state, and a file storing the first party data.

2. The method of claim 1, further comprising:
    storing condition data in said memory unit;
    locking access to said first party data using said mechanism for locking and unlocking access to said first party data; and
    unlocking access to said first party data using said mechanism only when transmitted data received from the second party is consistent with said condition data.

3. The method of claim 1, before said receiving step, further comprising the step of locking or unlocking access to said first-party data in said payment device by said first party using said mechanism.

4. The method of claim 1, further comprising the step of receiving an economic benefit from said second party by said first party in exchange for said first-party data.

5. The method of claim 4, wherein said economic benefit is a discount on a purchase made by said first party.

6. The method of claim 4, wherein said economic benefit is monetary.

7. The method of claim 4, wherein said economic benefit includes points for a loyalty program for which said first party is a participant.

8. The method of claim 1, wherein said mechanism for locking and unlocking access to said first-party data is a mechanical switch.

9. The method of claim 1, wherein said payment device is an integrated circuit card comprising a processing unit and said memory unit coupled to said processing unit.

10. The method of claim 9, wherein said mechanism for locking and unlocking access to said first-party data comprises an application stored in said memory unit.

11. The method of claim 10, wherein said memory unit further includes a data access code stored therein.

12. The method of claim 11, before the step of receiving, further comprising the steps of:
executing said application on said processing unit;
receiving a provided data access code from said first party;
providing said provided data access code to said application; and
unlocking access by said application to said first-party data responsive to whether said provided data access code matches said stored data access code.

13. The method of claim 12, wherein said memory unit further includes a data access flag indicative of whether said first-party data is in said locked state or said unlocked state, and wherein said step of unlocking access includes the step of storing in said data access flag a value indicative of said unlocked state for said first-party data responsive to whether said provided data access code matches said stored data access code.

14. The method of claim 10, further comprising the step of locking access to said first-party data by said application after each transmission of said first-party data.

15. The method of claim 1, wherein said step of providing said first-party data includes transmitting said first party data to a terminal capable of reading said payment device when said payment device is inserted therein.

16. The method of claim 1, wherein said payment device includes a transmitter for transmitting said first-party data using radio-frequency electromagnetic waves, and wherein said step of providing said first-party data includes transmitting said first-party data through radio-frequency electromagnetic waves.

17. The method of claim 1, wherein said payment device is a computer coupled to a computer network.

18. The method of claim 8, wherein said mechanical switch is located on said payment device.

19. The method of claim 1, wherein the payment application comprises a credit application.

20. The method of claim 1, wherein the payment application comprises a cash card application.

21. The method of claim 1, wherein performing payment processing comprises executing a payment application on the payment device.

22. A method for providing first party data to a merchant, said first party data related to a first party, the method comprising: providing a payment device comprising a mechanism for locking and unlocking access to said first party data; storing said first party data in a memory unit of said payment device, said first party data comprising at least one of an address, a telephone number, an email address, and demographic information of the first party; performing payment processing of a purchase between the first party and the merchant; receiving a request to read said first party data from said merchant; and after the payment processing, providing said first party data to said merchant in response to said request only when said first party data is in an unlocked state, a mechanism for determining whether said first party data is in said locked state or said unlocked state, and a file storing the first party data.

* * * * *